United States Patent Office 3,027,872
Patented Apr. 3, 1962

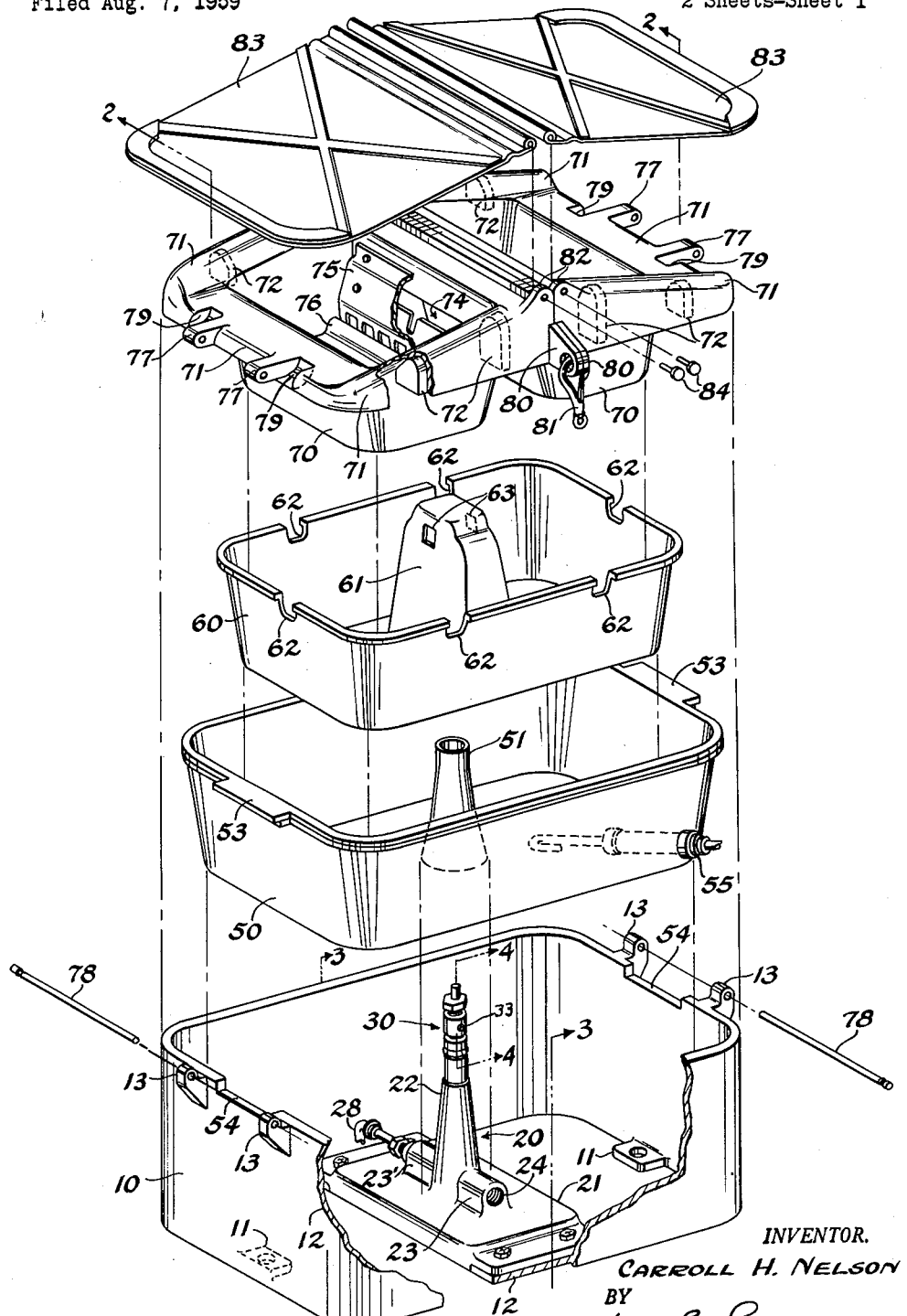

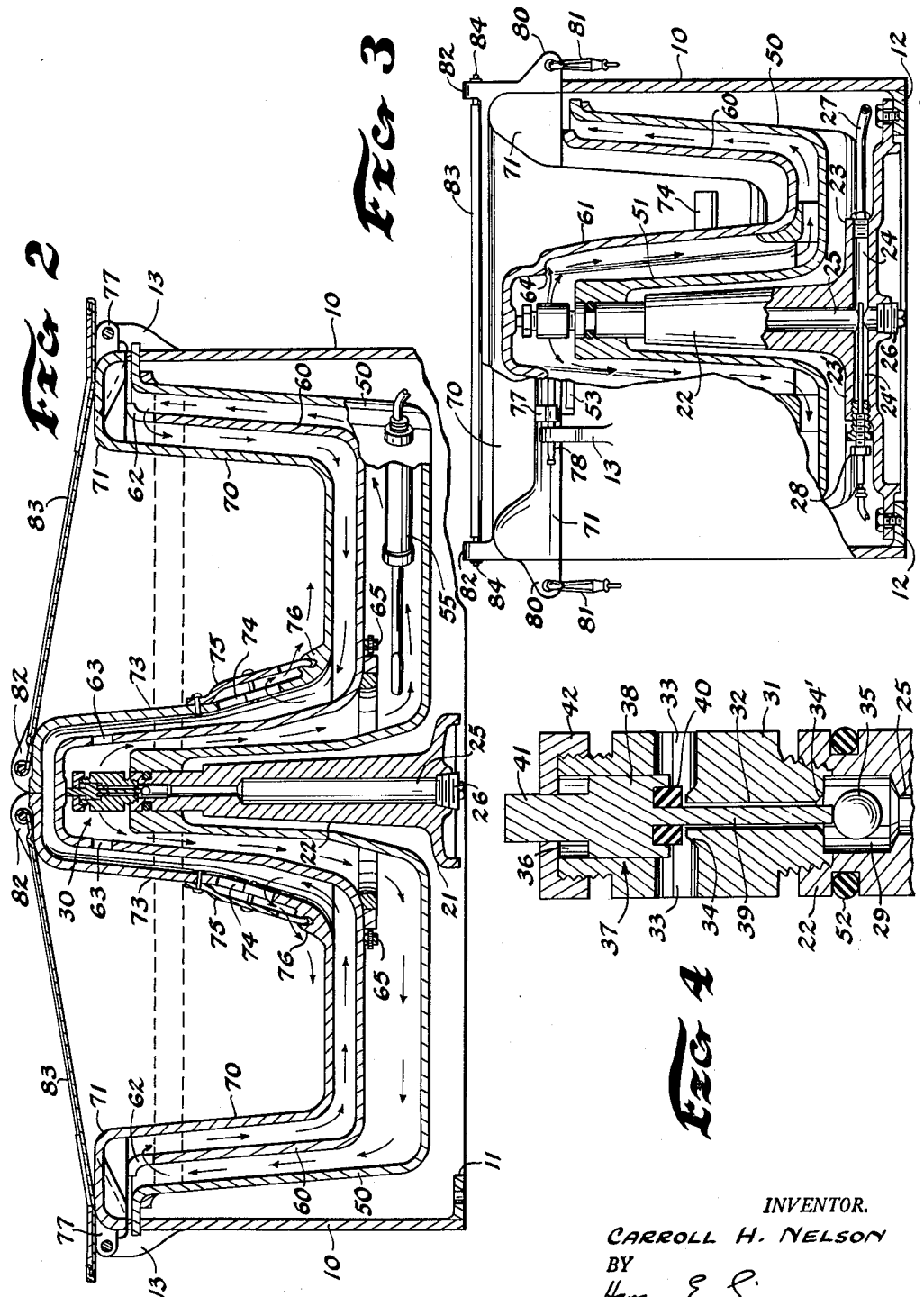

3,027,872
STOCK WATERER
Carroll H. Nelson, P.O. Box 616, Cedar Rapids, Iowa
Filed Aug. 7, 1959, Ser. No. 832,303
12 Claims. (Cl. 119—81)

My invention pertains to an improved stock waterer useful for cattle, hogs and other farm animals, including poultry, and in particular to a waterer of the kind wherein the height of the water is maintained automatically at a substantially constant level.

A wide variety of waterers of the type of my invention are known and in operation. The present waterer is an improvement of the basic kind shown and described in my prior United States Patents Nos. 2,590,266 and 2,664,070. Essentially, my prior waterers employ a reservoir having a water inlet and valve there to from a water supply source, a drinking bowl filled from the reservoir and a float device to operate the valve. The float holds the valve open while the reservoir, the float and the drinking bowl fill with water. The float is adjusted to sink, shutting off the valve, when the water level in the bowl reaches a predetermined height. When water is drunk from the bowl, thus lowering the water level therein, the float again becomes buoyant, opening the valve until the bowl is again filled with water to the proper level.

My present invention involves several features not hitherto employed in waterers of the kind referred to and which add greatly to their adaptability and ease and safety of operation. In the first place, I provide two drinking bowls spaced laterally from one another atop a common housing so that the waterer as a unit may be placed in a fence line, whereby stock on both sides of the fence may have access thereto. In the second place, I position the water outlet, which fills the reservoir, floating and drinking bowls, at a sufficient elevation so that it is at all times above both the water level therein and the overflow level thereof. The construction of prior waterers has been criticized because always the water outlet has been immersed in the reservoir. In such cases, were the pressure in the water supply system to drop or fail, it would be quite possible for contaminated water from the bowls to be siphoned back to the main supply tank or line, thus presenting a health hazard to human beings who may also use the same supply system for their needs. Indeed, to satisfy the requirements of many dairies, the outlet should also be above the overflow level in order to insure no back siphonage should the mechanism fail and the water rise above its normal level. In my present waterer since there can be no contact at any time between the water outlet to the reservoir and bowls and the water therein, any chance of mishap owing to back siphonage is removed. Finally, I provide an automatic shut-off system so that when my waterer is disassembled the water flow from the valve is automatically shut off, thus eliminating the need to cut off the water at its source.

Accordingly, the primary object of my invention is the provision of a waterer of the kind described having the water outlet therein so positioned and arranged as to prevent any back siphonage from the waterer, through the valve and into the water supply system.

A further object of my present invention is to provied a waterer of the kind described having both its water outlet therein from the water supply system and its valve therefor at all times above the highest water level in the unit.

An additional object of my present invention is the provision of an automatic shut-off valve for a waterer of the type described so that when the latter is disassembled for cleaning or other purposes the water supply thereto is automatically closed off.

Another object of my present invention is to provide a waterer of the class described with two drinking bowls laterally adjacent one another in a common housing so that the entire unit may be placed in a fence line to provide water to stock on both sides of the fence.

Other and further objects, features and advantages will be apparent from the description of the preferred form of my invention which follows, read in conjunction with the accompanying drawings, in which:

FIGURE 1 is an exploded assembly view in perspective with portions of various parts cut away;

FIGURE 2 is a sectional view taken along the lines 2—2 of FIGURE 1;

FIGURE 3 is an end elevational view, looking from the left of FIGURE 2, with various portions sectioned along the lines 3—3 of FIGURE 1; and FIGURE 4 is an enlarged section along the line 4—4 of FIGURE 1.

In order to facilitate understanding of the invention, reference is made to the embodiment thereof shown in the accompanying drawings and detailed descriptive language is employed. It will, nevertheless, be noted that no limitation of the invention is thereby intended and that various changes and alterations are contemplated such as would ordinarily occur to one skilled in the art to which the invention relates.

Referring now to the drawings, the waterer comprises a housing 10, which may be cast from a suitable material such as aluminum, open at its top and bottom and of generally rectangular shape with rounded corners. Projecting from the inside of each end wall of housing 10 at the middle thereof and flush with its bottom are oppositely disposed mounting lugs 11 by which housing 10 may be secured to a platform or other locating device, and extending inwardly from the inside of each side wall of housing 10 at the middle thereof and also flush with its bottom are tower support lugs 12. Two pairs of spaced and aligned hinge bosses 13 are provided adjacent the top of the end walls of housing 10 and project outwardly and upwardly above the top thereof. The latter and lugs 11 and 12 are preferably cast integral with housing 10.

Water tower 20, which may also be an integral aluminum casting, comprises two portions, a generally flat base 21 secured between lugs 12 and an upright water column 22 rising from the middle of vase 21 to slightly above the level of the top edges of housing 10. Base 21 is provided with integral horizontal bosses 23 and 23' on opposite sides of column 22 having bored therein water inlet and heating chambers 24 and 24' respectively, internally threaded and of equal size, communicating with a vertical water passage 25 step bored through column 22 and base 21 to the underside of the latter. The lower bore of passage 25 is made equal in diameter and length with chambers 24 and 24' and is internally threaded to take a suitable plug 26. A water supply pipe 27 from a water source is connected to chamber 24 and an electrical water heater 28 of the well-known pencil type is fitted water tight in chamber 24'. The upper bore of passage 25 provides a ball check chamber 29 whose upper end is internally threaded to take the lower end of a water inlet valve 30 thereabove.

Valve 30 employes an upright cylindrical housing 31 of less diameter than the upper end of column 22 having a valve water passage 32 bored in its lower portion and communicating axially with chamber 29. Communicating in turn with the upper end of passage 32 are opposed horizontal water outlets 33 bored in housing 31 and positioned at right angles to the side walls of housing 10.

The upper end of passage 32 is machined to form plunger seat 34 and its lower end, check seat 34', the latter being adapted to fit a ball check 35 of less diameter than chamber 29 and both captive and vertically movable therein. The portion of housing 31 above water outlets 33 is provided with a vertical plunger chamber 36 of cylindrical shape and axially aligned with passage 32 to take a plunger 37. The latter comprises a plunger body 38 slidable in chamber 36, an integral check rod 39 extending axially from the lower end of body 38 through and of smaller diameter than passage 32 to contact check ball 35, an annular gasket or washer 40 recessed in the shoulder between body 38 and rod 39 to bear upon seat 34 to close valve 30 when body 38 is slid downwardly in chamber 36, and an integral plunger operating rod 41 extending axially from the upper end of body 38 and of sufficient length, when washer 40 is on seat 34, to protrude above the upper surface of a plunger retaining cap 42, through which rod 41 passes, threaded upon the upper end of housing 31. Plunger body 38 is sufficiently shorter with respect to chamber 36 to permit check rod 39 to rise sufficiently to seat check ball 35 on seat 34', and check rod 39, in turn, is sufficiently long with respect to passage 32 to hold ball 35 off seat 34' until body 38 is raised above the point necessary to fully open passage 32 to outlets 33.

A substantially flat bottomed, open topped water reservoir 50, of generally rectangular shape and sized to fit down within housing 10 with its walls both spaced from the walls of housing 10 and flush with the top edges of the latter and its bottom spaced from base 21 of tower 20, is provided with a sleeve 51 integral therewith and extending upright from the middle of its bottom. Reservoir 50 may also be cast of aluminum or, if desired, molded from a suitable plastic material. Sleeve 51 is adapted to encompass column 22 and its height and the interior of its upper end are both sized so that sleeve 51 will slide down over valve 30 to be flush with the top of column 22 and to fit watertight to the latter by means of a suitable O ring 52 fitted in an annular groove in the latter. Reservoir 50 is suspended in housing 10 with sleeve 51 fitted to column 22 by means of lips 53 projecting horizontally outwards from the top of each end wall of reservoir 50 and fitting in corresponding enlarged recess 54 provided in the latter. One or more bottom corners of reservoir 50 may be drilled and threaded to take one or more cylindrical electric water heaters 55 extending horizontally inwardly just above the bottom of reservoir 50.

A substantially flat bottomed, open topped floating pan 60, of generally rectangular shape and size to fit down within reservoir 50 with its walls spaced from the walls of the latter to permit water to flow easily therebetween and to be movable vertically with respect thereto, is provided with a rectangular shaped hollow boss 61, each of whose walls faces a corresponding wall of pan 60, and positioned upright from the middle of the bottom of pan 60. The interior of boss 61 is opened to the underside of floating pan 60 and its shape and girth are sufficient both to encompass column 22 and valve 30 thereon in spaced relation thereto and to operatively contact the upper exposed end of operating rod 41. In addition, the height of the interior of boss 61 and the depth of pan 60 are both adjusted so that: (1) when the underside of boss 61 contacts operating rod 41 at its lowest position (at which point washer 40 is on seat 34), the bottom of pan 60 is just sufficiently spaced above the bottom of reservoir 50 both to permit water to flow easily therebetween and not to interfere with heaters 55, this latter position of pan 60 being hereafter referred to as its "lower position"; and (2) when boss 61 and operating rod 41 are together raised to the fully open position of passage 32 with respect to outlets 33, the top edges of the walls of pan 60 are flush with the top edges of the walls of housing 10 and reservoir 50, this latter position of pan 60 being hereafter referred to as its "upper position."

Accordingly, when pan 60 is at its upper position (see FIGURES 2 and 3), the upper portion of boss 61 enclosing valve 30 is above the top edges of housing 10 and reservoir 50. The upper edges of pan 60 are provided with water inlets 62, all equidistant from the bottom of pan 60 and spaced about its upper edges. The walls of boss 61 opposite the end walls of housing 10 are provided with air escape ports 63 above the level of the top edge of housing 10 when pan 60 is in its upper position, and the interior walls of boss 61 are provided with integral, downwardly facing concave cusps 64 positioned opposite and slightly above the level of each water outlet 33 from valve 30, when pan 60 is at its lower position. Floating pan 60 and boss 61 are preferably constructed to have sufficiently great a weight in water that while pan 60, owing to its shape, will float at its upper position upon a sufficient amount of water in reservoir 50, it will nevertheless both sink therein to its lower position when filled with water to the level of that in reservoir 50 and at the same time hold plunger 37 down on its seat 34 against water pressure in passage 32. The latter may be accomplished by forming pan 60 and boss 61 separately, boss 61 being of a heavy material compared with that of pan 60. To adjust the weight of pan 60 for different water pressures in passage 32, its bottom may be provided with suitable means to secure thereto weights 65 of varying sizes.

A pair of drinking bowls 70, of generally rectangular shape and cast from a material such as aluminum, are fitted atop the ends of housing 10 on each side of boss 61 and are sized both to fit down within pan 60 and to be spaced from the walls and bottom thereof and from boss 61 sufficiently both to permit water to flow easily there between and not to interfere with the upper or lower position of pan 60 in reservoir 50. Bowls 70 are supported on the top of housing 10 by rims 71 formed by extending the walls of each bowl 70 corresponding to the end and side walls of housing 10 upwardly above the latter and then outwardly and downwardly to seat their edges on housing 10. The adjacent portions of rims 71 on each side of housing 10 are each carried toward each other along the top edge of housing 10, the height of each thereabove gradually increasing, to abut one another midway therealong. Spaced at each side of bowls 70 and between the side walls thereof and rims 71 are integral webs 72 extending down flush with the top edges of housing 10 to contact the top edges of pan 60 in order to limit the rise of the latter upon water in reservoir 50 to its upper position. The interior corners and edges of bowls 70 are radiused to permit easy cleaning. The inner walls 73 thereof on opposite sides of boss 61 are provided with water inlets 74 thereto from pan 60 in the form of upright T-shaped slots positioned equidistant from the bottoms of bowls 70 so that each inlet is entirely below the level of water inlets 62 to pan 60 when the latter is at its upper position, and shaped so that the vertical portion of the T is sufficiently long to have at least a part thereof below the level of inlets 62 when pan 60 is at its lower position. Inlets 74 in turn are provided thereabout with baffles 75 secured to walls 73. Baffles 75 curve gently outwardly and downwardly from above inlets 73 and have their lower edges deeply serrated, the lower ends only of the serrations fitting into bosses 76 on the interior of bowls 70 below inlets 74. In this manner a horizontal grille is formed over the latter which prevents dirt dropped in bowls 70 from the snouts of the animals from entering float pan 60 through inlets 74. Walls 73 of bowl 70 are extended upwardly to merge with their respective adjacent portions of rims 71 and also converge to abut each other midway above boss 61 and a sufficient distance therefrom not to interfere with the latter when pan 60 rises to its upper position, whereby the top of housing 10 is completely enclosed and the interior of the unit kept free of dirt. The portions of rims 71 above each end wall of housing 10 are each provided with a pair of horizontal, outwardly projecting hinge bosses 77 integral therewith, each one of the latter being aligned side by side with one of hinge bosses 13 and bored therewith to take hinge pins 78, whereby bowls 70 each may be swung upwardly and outwardly from the top of housing 10 to permit access to the interior of the waterer. In order to allow sufficient hinge movement of bowls 70, the portion of rims 71 thereon directly above each hinge boss 13 is provided with a relief 79 to receive the latter.

Inasmuch as the animals can sometimes raise bowls 70 with their snouts sufficiently to get within housing 10, it is desirable to include some means of locking bowls 70. For this purpose, each pair of adjoining edges of rims 71 is provided with a pair of outwardly projecting locking bosses 80 integral therewith and aligned side by side and bored to take clips 81 therethrough. Also it is desirable to provide some cover for bowls 70 which can remain closed most of the time both to keep out dirt and dust and to keep in heat in the winter, but at the same time permit access thereto by the animals. To accomplish this, atop each pair of abutting corners of bowls 70 a pair of spaced cover hinge bosses 82 are provided extending vertically therefrom. A flat, generally rectangular bowl cover 83 is hinged at one edge thereof between hinge bosses 82 on each bowl 70 by suitable pins 84 and slopes downwardly upon rims 71 thereof to overhang the corresponding end wall of housing 10.

The operation of the waterer is as follows: The unit is placed in the barnyard, feed lot or dairy loafing barn, or in a fence line with a bowl 70 on each side thereof, and, if desired, housing 10 is secured in position by means of lugs 11 thereon. Water supply pipe 27 is connected to a water source, clips 81 are removed and bowls 70 are swung open to expose floating pan 60. The latter is raised by hand sufficiently to permit valve 30 to open, but not so far as to permit check ball 35 to close on seat 34'. Water then flows in through pipe 27 and inlet chamber 24, up water passage 25 and around check ball 35, urging the latter against check rod 39, up valve passage 32 past check rod 39, and out through outlets 33 to strike the inner walls of boss 61 facing outlets 33. Cusps 64 tend to direct the water down between the interior of boss 61 and column 22, whence it flows into reservoir 50. As soon as the water level in reservoir 50 rises sufficiently to render pan 60 buoyant, the latter may be released for then the underside of boss 61 will be at a sufficient height to permit the pressure of the water coming up passage 25 to hold both plunger 37 off of seat 34 and operating rod 42 against the underside of boss 61. At this point bowls 70 may be swung back to their drinking position atop housing 10 and clips 81 replaced through locking bosses 80, for the operation of the waterer is henceforth automatic.

As the water level in reservoir 50 continues to rise, pan 60 will float upwards therewith until its top edges contact webs 72 to hold pan 60 at its upper position, no matter how much additionally the water level in reservoir 50 may rise. When the water in the latter reaches the level of inlets 62 in pan 60, the air trapped within boss 61 having escaped through ports 63, the water spills therethrough into float pan 60, the water level in reservoir 50 thereafter remaining constant at the level of inlets 62. When in turn the water in pan 60 rises to the level of inlets 74 in bowls 70, it will spill therethrough and begin to fill the latter. Thenceforth the water levels in pan 60 and bowls 70 will rise together until they reach the constant water level in reservoir 50, as shown by the upper broken line in FIGURE 2. At this point, owing to the weight of pan 60, it will sink downwardly in reservoir 50 to its lower position, so that boss 61 urges plunger 37 down on seat 34 to close valve 30.

The overhanging edges of covers 83 permits the snouts of thirsty animals to raise the latter for access to the water in bowls 70. As water is drunk from the latter, the water level therein and, owing to inlets 74, the water level in pan 60, both decline. At the same time, owing to the now lower position of inlets 62, the water level in reservoir 50 also declines. When the water levels in reservoir 50, pan 60 and bowls 70 together reach the lower level of inlets 62, as shown by the lower broken line in FIGURE 2, the water level in reservoir 50 will thenceforth remain constant while that in pan 60 and bowls 70 continues to decline. Thereupon, pan 60 will again become buoyant, permitting the water pressure in passage 25 to raise plunger 37 and open valve 30 until pan 60 and bowls 70 are again filled to the proper level as just described. The water in bowls 70 is therefore automatically replenished after each consumption by stock. Should valve 30 fail for some reason to shut off the water, the latter will overflow reservoir 50 and housing 10 through recesses 54 before reaching valve 30 and outlets 33 owing to the height of tower 20.

The waterer is easily cleaned simply by removing clips 81 and swinging bowls 70 upward to expose floating pan 60 and reservoir 50 which may both then be easily lifted out of housing 10. When pan 60 and its boss 61 are lifted from plunger operating rod 41, the water pressure in passage 25 urging check ball 35 against check rod 39, moves plunger 37 upwardly sufficient to withdraw check rod 39 within passage 32 until check ball 35 contacts seat 34', thus shutting off the water. For this reason it is not necessary to close off the water at the supply in order to avoid its waste when disassembling the waterer for cleaning or other purposes.

Heaters 28 and 55 may be activated during cold portions of the year to keep the water from freezing in water tower 20 and valve 30 and in reservoir 50, pan 60 and bowls 70, respectively. If necessary, the positions of plug 26 and heater 28 may be exchanged to provide a more centrally located source of heat for water tower 20 in case of severe cold. The central position of the latter in reservoir 50 also helps keep it warm.

I claim:

1. A double stock waterer comprising an open top housing having walls, an open top water reservoir removably fitted within and to said housing, a water tower mounted upright from the bottom of said reservoir to at least the height of the walls of the latter, means on said tower connectable to a source of water under pressure to supply said reservoir, an open top floating pan removably positioned within and spaced from said reservoir, said pan being floatable upon water in said reservoir and riseable within said reservoir with rise in the level of water in the latter, the upper edge of said pan being limited to rise to a predetermined height, a water inlet to said pan from said reservoir, said inlet being sufficiently distant from the bottom of said pan to permit the latter to floatably rise with the water level in said reservoir to said predetermined height before becoming operative to fill said pan, said connectable means including a water valve on said tower having a water outlet therefrom to said reservoir above said tower and operative to its open position when said pan is floating in said reservoir, a hollow boss having its interior open to said reservoir and extending upwardly from the bottom of said pan to encompass said tower and valve and operatively spaced therefrom, said boss being operatively associated with said valve and said boss and pan together having a weight sufficient when the latter is filled with water to the level of that in said reservoir to sink in the latter and close said valve, a pair of laterally spaced removable drinking bowls fitted atop said housing, each of said bowls having a containing portion fitting down within said pan to below said inlet therein when said pan is sunk in said reservoir and operatively spaced from said pan and boss, each of said containing portions having a water inlet thereto from said pan.

2. A double stock waterer comprising an open top generally rectangular shaped housing having vertical walls, a generally rectangular shaped open top water reservoir removably fitted within and to the walls of said housing, a water tower mounted upright from the center of the bottom of said housing to above the top of the walls thereof, said tower passing through the bottom of said reservoir and sealed watertight therewith, means on said tower connectable to a source of water under pressure to supply said reservoir, a generally rectangular shaped float pan removably positioned within and operatively spaced from said reservoir and floatable upon water therein, the upper edge of said pan being limited to rise only to the top of the walls of said housing and being provided with spaced water inlets from said reservoir equidistant from the bottom of said pan, said connectable means including a water inlet to said tower adjacent the bottom thereof and a water valve above the top thereof, said valve having water outlets therefrom to said reservoir and including a vertical plunger slidable downwards to close said valve and urgeable upwards by water pressure thereon to open said valve, said plunger having its upper end protruding above said valve, a hollow boss having its interior open to said reservoir and extending upwardly from the center of the bottom of said pan to encompass said tower and valve and operatively spaced therefrom, the under side of the top of said boss being adapted when said valve is open and said pan is floating in said reservoir to contact the upper end of said plunger and the weight of said boss and pan together being sufficient when the latter is filled with water to the level of that in said reservoir to sink therein and move said plunger downwards to close said valve against the water pressure thereon, a pair of generally rectangular shaped drinking bowls above said pan at respective ends of said housing and laterally spaced from said boss with a containing portion of each fitting down within said pan to below said inlets thereto when said pan is sunk in said reservoir and operatively spaced therefrom, a water inlet in each of said portions from said pan, each of said bowls having their respective edges adjacent said boss extending to abut one another midway above said boss in operatively spaced relation to the latter and having supporting rims on each of their remaining edges extending to seat upon the entire top edge of said housing and to abut one another midway along the top of each side wall of said housing, said rims being hinged to their respective end walls of said housing to permit each of said bowls to pivot upwardly and over said end walls for access to and removal of said pan and reservoir.

3. The device of claim 2 wherein said valve is provided with check means to close said valve when the top edge of said pan is raised above the top of the walls of said housing, said means including a vertical water bore in said valve below said plunger and in axial alignment therewith, a valve seat upstream of said bore, a ball upstream of said seat and seatable thereon by water pressure to close said valve, an extension on said lower end of said plunger and slidable therewith, said extension being smaller than said bore and projecting therethrough sufficiently to hold said ball off said seat until the top edge of said pan is raised above the top of the walls of said housing.

4. A double stock waterer comprising an open top water reservoir, a water tower extending upwards from the bottom of said reservoir and having means thereon connectable to a source of water under pressure to supply said reservoir, an open top float vessel fitting down in said reservoir in spaced relation thereto and to said tower, said vessel being floatable upon water in said reservoir and riseable with rise in the level of water in said reservoir, means to limit said rise of vessel to a predetermined height, a water inlet to said vessel from said reservoir, said inlet being sufficiently distant from the bottom of said vessel to permit the latter to floatably rise with the water level in said reservoir to said predetermined height before becoming operative to fill said vessel, said connections means including a water inlet to said tower adjacent the bottom thereof and a water valve above both the top thereof and the level of said inlet to said vessel when the latter is at said predetermined height, a hollow boss having its interior open to said reservoir and extending upwardly from the bottom of said vessel to encompass said tower and valve in operative spaced relation thereto, said valve having a water outlet therefrom to said reservoir arranged so that all of the water issuing therefrom flows first into said reservoir before any flows into said vessel and including a plunger slidable downwards to close said valve and upwards to open said valve, said plunger being held in its valve open position by water pressure thereon when said vessel and boss are at said predetermined height and said boss being operatively associated with said plunger and having together with said vessel a sufficient weight when the latter is filled with water to the level of that in said reservoir to sink in the latter and move said plunger downwards to close said valve, a pair of drinking bowls laterally spaced above said vessel with containing portion of each fitting down within said vessel to below said inlet therein when said vessel is sunk in said reservoir and operatively spaced from said vessel and boss, each of said portions having a water inlet thereto from said vessel.

5. A double stock waterer comprising an open top water reservoir, a water tower extending upwards from said reservoir and having means thereon connectable to a source of water under pressure to supply said reservoir, an open top float vessel fitting down in said reservoir in operative spaced relation thereto and to said tower, said vessel being floatable upon water in said reservoir and riseable with rise in the level of water therein, means to limit said rise of said vessel to a predetermined height, a water inlet to said vessel from said reservoir, said inlet being sufficiently distant from the bottom of said vessel to permit said vessel to floatably rise with the water level in said reservoir to said predetermined height before becoming operative to fill said vessel, said connectable means including a water inlet to said tower, a valve thereon and a water outlet therefrom to said reservoir arranged so that all of the water issuing therefrom flows first into said reservoir before any flows into said vessel and located above the level of said inlet to said vessel when the latter is at said predetermined height, said valve being operable by water pressure to its open position while said vessel is floatable in said reservoir and said vessel being operatively associated with said valve and of sufficient weight when filled with water to the level of that in said reservoir to sink therein and close said valve, a pair of drinking bowls laterally spaced above said vessel on opposite sides of said tower with a containing portion of each fitting down within said vessel to below said inlet therein when said vessel is sunk in said reservoir and operatively spaced from said vessel and tower, each of said bowl portions having a water inlet thereto from said vessel.

6. The device of claim 5 wherein said valve includes a valve seat and a plunger downstream of said seat with sealing means thereon bearable against said seat, said plunger being operative toward said seat to a valve closed position by said weight of said vessel when sunk and operative in the opposite direction by water pressure thereagainst to a valve open position when said vessel is floating.

7. The device of claim 6 wherein said valve is provided with check means to close said valve when said vessel is raised above said predetermined height, said means including a water passage through a portion of said valve and upstream of said first seat, a second valve seat upstream of said passage, a check ball seatable upon said second seat in a valve closed position, said ball being positioned upstream of said second seat and urgeable thereupon by water pressure against said ball, an extension on said plunger and operative therewith, said extension being smaller than said passage and projecting therethrough sufficiently to hold said ball off said second seat while said float vessel is at or below said predetermined height.

8. A double stock waterer comprising a water reservoir opening upwards, means connectable to a source of water under pressure to supply said reservoir, an upwardly opening float vessel fitting down in said reservoir in spaced relation thereto and floatable upon water therein, said vessel being limited to rise only to a predetermined height with a rise in the level of water in said reservoir, a water inlet in said vessel from said reservoir sufficiently distant from the bottom of said vessel to permit said vessel to floatably rise with the water level in said reservoir to said predetermined height before becoming operative to fill said vessel, said connectable means including a water inlet to said reservoir arranged so that all of the water issuing therefrom flows first into said reservoir before any flows into said vessel and positioned above said inlet to said vessel when the latter is at its predetermined height and a valve operable to its open position while said vessel is floatable in said reservoir, said valve being operatively associated with the said vessel and the latter being of sufficient weight when filled with water to the level of that in said reservoir to sink therein and close said valve, a pair of drinking bowls laterally spaced above said vessel with a containing portion of each fitting down within said vessel to below said inlet therein when said vessel is sunk in said reservoir and operatively spaced from said vessel, each of said bowl portions having a water inlet thereto from said vessel.

9. A stock waterer comprising a water reservoir opening upwards, means connectable to a source of water under pressure to supply said reservoir, an upwardly opening float vessel fitting down in said reservoir in spaced relation there to and floatable upon water therein, said vessel being limited to rise only to a predetermined height with a rise in the level of water in said reservoir, a water inlet in said vessel from said reservoir sufficiently distant from the bottom of said vessel to permit said vessel to floatably rise with the water level in said reservoir to said predetermined height before becoming operative to fill said vessel, said connectable means including a water inlet to said reservoir positioned above the overflow levels of both said vessel and said reservoir and a valve operable to its open position while said vessel is floating in said reservoir, said valve being operatively associated with said vessel and the latter being of sufficient weight to sink in said reservoir when filled with water to the level of that in the latter to close said valve, a drinking bowl positioned above said vessel with a containing portion thereof fitting down within said vessel to below said inlet therein when said vessel is sunk in said reservoir and operatively spaced from said vessel, said portion having a water inlet thereto from said vessel.

10. A stock waterer comprising an open top water reservoir, means connectable to a source of water under pressure to supply said reservoir, an open top float vessel fitting down in said reservoir in spaced relation thereto and floatable upon water therein, said vessel being riseable with rise in the level of water in said reservoir, means to limit said rise of said vessel to a predetermined height, a water inlet in said vessel from said reservoir sufficiently distant from the bottom of said vessel to permit said vessel to floatably rise with the water level in said reservoir to said predetermined height before becoming operative to fill said vessel, said connectable means including a water inlet to said reservoir positioned above the overflow levels of both said reservoir and said vessel and a valve operable by water pressure to its open position while said vessel is floating in said reservoir and provided with check means to close said valve when said vessel is raised above said predetermined height, said vessel being operatively associated with said valve and of sufficient weight when filled with water to the level of that in said reservoir to sink therein and close said valve, a drinking bowl positioned above said vessel with a containing portion thereof fitting down within said vessel to below said inlet therein when said vessel is sunk in said reservoir and operatively spaced from said vessel, said portion having a water inlet thereto from said vessel.

11. The device of claim 10 wherein said valve includes a valve seat and a plunger downstream of said seat with sealing means thereon bearable against said seat, said plunger being operative toward said seat to a valve closed position by said weight of said vessel when sunk and operative in the opposite direction by water pressure thereagainst to a valve open position when said vessel is floating.

12. The device of claim 11 wherein said check means includes a water passage through a portion of said valve and upstream of said first seat, a second valve seat upstream of said passage, a ball seatable upon said second seat in a valve closed position, said ball being positioned upstream of said second seat and urgeable thereupon by water pressure against said ball, an extension on said plunger and operative therewith, said extension being smaller than said passage and projecting therethrough sufficiently to hold said ball off said second seat while said float vessel is at or below said predetermined height.

References Cited in the file of this patent

UNITED STATES PATENTS

| | | |
|---|---|---|
| 2,662,503 | Johnson | Dec. 15, 1953 |
| 2,754,838 | Gates et al. | July 17, 1956 |